United States Patent
Matsuda et al.

(10) Patent No.: US 10,352,809 B2
(45) Date of Patent: Jul. 16, 2019

(54) PHYSICAL QUANTITY MEASURING DEVICE

(71) Applicant: NAGANO KEIKI CO., LTD., Tokyo (JP)

(72) Inventors: Takahiro Matsuda, Tokyo (JP); Yasuhisa Tanaka, Tokyo (JP); Jinichi Todoroki, Tokyo (JP)

(73) Assignee: NAGANO KEIKI CO., LTD., Tokyo (JP)

(*) Notice: Subject to any disclaimer, the term of this patent is extended or adjusted under 35 U.S.C. 154(b) by 92 days.

(21) Appl. No.: 15/832,843

(22) Filed: Dec. 6, 2017

(65) Prior Publication Data

US 2018/0164175 A1 Jun. 14, 2018

(30) Foreign Application Priority Data

Dec. 8, 2016 (JP) .................................. 2016-238905

(51) Int. Cl.
*G01L 19/14* (2006.01)
*G01L 19/00* (2006.01)
*G01L 19/06* (2006.01)

(52) U.S. Cl.
CPC .............. *G01L 19/14* (2013.01); *G01L 19/00* (2013.01); *G01L 19/0069* (2013.01);
(Continued)

(58) Field of Classification Search
None
See application file for complete search history.

(56) References Cited

U.S. PATENT DOCUMENTS

2014/0338448 A1* 11/2014 Ashino ................... G01P 15/08
  73/488
2015/0160085 A1* 6/2015 Kobayashi ............ G01L 9/0041
  73/723

(Continued)

FOREIGN PATENT DOCUMENTS

DE           10144350 A1   3/2002
DE       102014108780 A1  12/2015
(Continued)

OTHER PUBLICATIONS

European Search Report dated Sep. 3, 2018, 13 pages.
European Search Report dated May 8, 2018, 12 pages.

*Primary Examiner* — Andre J Allen
(74) *Attorney, Agent, or Firm* — Rankin, Hill & Clark LLP (57) ABSTRACT

A physical quantity measuring device includes: a cylindrical portion having therein an inner space; a first case provided to a first end of the cylindrical portion; a sensor unit housed in the first case; a second case provided to a second end of the cylindrical portion; a circuit portion housed in the second case; a heat insulating portion disposed to face the sensor unit; a sealing portion that defines a hermetic seal between the heat insulating portion and an inner circumferential surface of the cylindrical portion; a first partition member that separates the sensor unit from the inner space at the first end; and a heat-insulative second partition member that is in contact with an opening edge or the inner circumferential surface of the second end and separates the inner space from the circuit portion near the second end.

9 Claims, 7 Drawing Sheets

(52) U.S. Cl.
CPC .......... *G01L 19/06* (2013.01); *G01L 19/0681* (2013.01); *G01L 19/142* (2013.01); *G01L 19/143* (2013.01)

(56) References Cited

U.S. PATENT DOCUMENTS

| | | | |
|---|---|---|---|
| 2016/0187218 A1* | 6/2016 | Ite .......................... | G01L 13/025 73/717 |
| 2017/0059438 A1* | 3/2017 | Ite .......................... | G01L 27/002 |
| 2018/0259409 A1* | 9/2018 | Sekine ................... | G01L 9/125 |

FOREIGN PATENT DOCUMENTS

| | | |
|---|---|---|
| JP | 10-185735 | 7/1998 |
| JP | 2003-042869 | 2/2003 |
| JP | 4563312 | 8/2010 |

* cited by examiner

PHYSICAL QUANTITY MEASURING DEVICE

The entire disclosure of Japanese Patent Application No. 2016-238905 filed Dec. 8, 2016 is expressly incorporated by reference herein.

TECHNICAL FIELD

The present invention relates to a physical quantity measuring device.

BACKGROUND ART

Physical quantity measuring devices each including a sensor unit for detecting a physical amount (e.g. pressure of a target fluid) and a circuit portion for processing signals outputted by the sensor unit have been known. Some of the physical quantity measuring devices are designed not to transmit heat of a target fluid to the circuit portion.

Typical examples of this type of physical quantity measuring device include a pressure sensor including: a pressure receiver provided with a sensor chip for detecting pressure; and a pressure transmitter provided with cooling fins for dissipating heat generated at the pressure receiver (Patent Literature 1; JP 2003-42869 A).

Another one of the typical examples of the physical quantity measuring device is an electrostatic capacitance pressure sensor including: a sensor housing that houses an electrostatic capacitance sensor for detecting gas pressure and a heater for heating the sensor; a circuit housing that houses a circuit portion for processing signals outputted by the sensor; and a heat-transmission blocker that defines a partition between the sensor housing and the circuit housing (Patent Literature 2; JP 4563312 B2).

The typical example according to Patent Literature 1, which includes the cooling fins on the pressure transmitter, requires convection around the cooling fins in order to efficiently dissipate the heat. If the cooling effect provided by cooling fins is insufficient, the heat at the pressure receiver is transmitted to the circuit portion through the pressure transmitter to deteriorate the measurement accuracy.

According to the typical example disclosed in Patent Literature 2, when the surroundings of the circuit housing are cooled, dew condensation is likely to be caused inside the circuit housing. If the pressure sensor is disposed so that the circuit housing is located at a lower side and the sensor housing is located at an upper side, the dew condensation caused at the circuit housing may flow to reach the circuit portion, thereby causing malfunction and the like.

SUMMARY OF THE INVENTION

An object of the invention is to provide a physical quantity measuring device, in which heat of a target fluid is not easily transmitted to a circuit portion and dew condensation generated inside a cylindrical portion is not likely to adversely affect an operation of the physical quantity measuring device.

A physical quantity measuring device according to an aspect of the invention includes: a cylindrical portion defining an inner space; a first case provided to a first end of the cylindrical portion; a sensor unit housed in the first case, the sensor unit being configured to output a signal corresponding to a physical amount of a target fluid; a second case provided to a second end of the cylindrical portion; a circuit portion housed in the second case, the circuit portion being configured to calculate the physical amount of the target fluid based on the signal received from the sensor unit; a first partition member comprising a heat insulating portion disposed to face the sensor unit and a sealing portion configured to provide a hermetic seal between the heat insulating portion and an inner circumferential surface of the cylindrical portion, the first partition member defining a partition between the sensor unit and the inner space of the cylindrical portion near the first end of the cylindrical portion; and a heat-insulative second partition member that is in contact with an opening edge or the inner circumferential surface of the second end of the cylindrical portion, the second partition member defining a partition between the inner space of the cylindrical portion and the circuit portion near the second end of the cylindrical portion.

According to the above aspect of the invention, the sensor unit outputs the signal corresponding to the physical amount (e.g. pressure) of the target fluid to the circuit portion. The circuit portion calculates the physical amount of the target fluid based on the signal received from the sensor unit.

When the temperature of the target fluid is higher or lower than an ambient temperature of the physical quantity measuring device, the heat of the target fluid is transmitted to the sensor unit. The heat tends to be transmitted to the circuit portion in the second case through the cylindrical portion. However, the heat insulating portion of the first partition member is disposed to face the sensor unit near the first end of the cylindrical portion. The heat insulating portion restrains the heat of the sensor unit from being transmitted to the inner space of the cylindrical portion.

Further, the inner space of the cylindrical portion defines a layer partitioned between the first partition member and the second partition member to restrain the transmission of the heat of the sensor unit to the second case.

Further, since the second partition member is heat-insulative, even when the heat transmission cannot be completely blocked by the heat insulating portion of the first partition member and the inner space of the cylindrical portion, the heat-insulative second partition member restrains the heat transmission from the inner space of the cylindrical portion to the circuit portion.

As described above, the physical quantity measuring device of the above aspect of the invention includes heat-insulating portions such as the first partition member provided with the heat insulating portion, the heat-insulative second partition member, and the inner space of the cylindrical portion partitioned between the first partition member and the second partition member. Accordingly, the transmission of the heat of the sensor unit, which is received from the target fluid, to the circuit portion can be restrained. Thus, the influence of the heat on the circuit portion can be reduced, thereby preventing a decrease in the measurement accuracy.

Further, the dew condensation, which may be generated inside the cylindrical portion, is unlikely to adversely affect the operation of the device in the above aspect of the invention.

Specifically, since the sealing portion of the first partition member provides a hermetic seal between the heat insulating portion and the inner circumferential surface of the cylindrical portion at the first end of the cylindrical portion, the dew condensation is kept from flowing from the inner space of the cylindrical portion into the first case. Accordingly, the sensor unit is kept from being wet to get out of order.

Further, at the second end of the cylindrical portion, the second partition member, which is in contact with the opening edge or the inner circumferential surface of the second end of the cylindrical portion, separates the inner space of the cylindrical portion and the circuit portion. Accordingly, even when the physical quantity measuring device is placed with the second case being positioned at a lower side and the dew condensation flows from the first end of the cylindrical portion along the inner circumferential surface of the cylindrical portion, the second partition member blocks the flow of the dew condensation. The dew condensation is thus kept from flowing into the second case, so that the malfunction of the circuit portion due to adhesion of water drops and the like can be prevented.

In the physical quantity measuring device according to the above aspect of the invention, it is preferable that the inner space of the cylindrical portion is filled with air, and the cylindrical portion has a circular outer cross section whose diameter is constant or gradually changes along an axial direction of the cylindrical portion.

The physical quantity measuring device having the above arrangement is suitably usable in an environment required to be sufficiently hygienic (e.g. food production line, medicine production line and cosmetics production line). Specifically, the physical quantity measuring device of the above arrangement is not provided with the cooling fins as in the related art, and an outer circumferential surface of the cylindrical portion has a smooth profile. The above arrangement eliminates the necessity for cleaning the narrow recesses, which may be defined in the cooling fins, facilitating the cleaning of the device.

Further, air filled in the inner space of the cylindrical portion instead of coolant does not adversely affect the external environment even when leaked.

Since air is filled in the inner space of the cylindrical portion, the thickness of the cylindrical portion can be reduced as compared with a cylindrical portion filled with coolant. Accordingly, the heat can be restrained from being transmitted from the first case housing the sensor unit to the second case through the cylindrical portion. Further, the air layer formed in the inner space of the cylindrical portion can also be used to insulate the heat.

In the physical quantity measuring device according to the above aspect of the invention, it is preferable that the cylindrical portion includes: a large-diameter cylindrical portion provided with the first case and the first partition member; a small-diameter cylindrical portion provided with the second case and the second partition member; and a connector cylindrical portion that connects the large-diameter cylindrical portion and the small-diameter cylindrical portion.

The above arrangement of the cylindrical portion allows an increase in the size of the large-diameter cylindrical portion without changing the sizes of the second case and the small-diameter cylindrical portion and, consequently, the size of the entire device. Since the surface area increases by increasing the size of the large-diameter cylindrical portion, a large heat dissipation effect can be obtained. Further, when a variety of the physical quantity measuring devices with different sizes of the large-diameter cylindrical portions are to be manufactured, the production cost can be reduced by using common components for the second case and common components for the second partition member for the physical quantity measuring devices.

In the physical quantity measuring device according to the above aspect of the invention, it is preferable that at least one of the heat insulating portion of the first partition member or the second partition member is a heat-resistant-resin packing.

According to the above arrangement, the structure of the heat insulating portion of the first partition member and/or the structure of the second partition member can be simplified and the second partition member and/or the heat insulating portion of the first partition member can be easily attached to the cylindrical portion.

In the physical quantity measuring device according to the above aspect of the invention, it is preferable that the sealing portion of the first partition member is a resin member fully covering one surface of the heat insulating portion.

According to the above arrangement, the sealing portion can be formed by pouring a resin into the cylindrical portion from the second end while the heat insulating portion is provided in the cylindrical portion. Accordingly, the sealing portion can be easily provided.

In the physical quantity measuring device according to the above aspect of the invention, it is preferable that the second case includes a bottomed-cylindrical outer case and an inner case provided therein with the circuit portion, an outer circumferential surface of the inner case being fitted to an inner circumferential surface of the outer case, the second end of the cylindrical portion penetrates through the outer case to be positioned in the outer case, and the second partition member includes: a base that is in contact with an opening edge of the second end of the cylindrical portion at an inside of the outer case and is fitted to the second end; an engagement portion engaged with the inner case; and a contact portion that is in contact with a bottom of the outer case.

According to the above arrangement, the second case can be easily attached to the cylindrical portion using the second partition member. For instance, with the second end of the cylindrical portion penetrating through the outer case, the base of the second partition member is fitted to the second end and the contact portion is brought into contact with the bottom of the outer case. Then, while the inner case is fitted to the outer case, the engagement portion of the second partition member is engaged with the inner case. Thus, the cylindrical portion, the outer case and the inner case are connected with one another via the second partition member. In other words, the second partition member keeps the inner case from rotating along the inner circumferential surface of the outer case and also serves as a fastener for preventing the detachment of the inner case from the outer case.

In the physical quantity measuring device according to the above aspect of the invention, it is preferable that the second partition member includes: a base disposed to cover an opening of the second end of the cylindrical portion; and an annular wall that extends from the base to the inner space of the cylindrical portion and is in contact with the inner circumferential surface of the second end of the cylindrical portion, in which the inner circumferential surface of the cylindrical portion and the annular wall define a receiver therebetween, the receiver being recessed toward the second end of the cylindrical portion.

According to the above arrangement, when the physical quantity measuring device is placed with the second case being located at a lower side, the dew condensation flowing along the inner circumferential surface of the cylindrical portion enters the receiver to be trapped therein. Accordingly, the dew condensation can be further reliably kept from flowing into the second case.

In the physical quantity measuring device according to the above aspect of the invention, it is preferable that the sensor unit includes a diaphragm, and a board supporting the diaphragm, an inner space is defined between the board and the diaphragm, and the physical quantity measuring device further includes an air releaser that intercommunicates the inner space of the sensor unit and an outside.

According to the above arrangement, the inner space of the sensor unit is in communication with the outside through the air releaser. Accordingly, the pressure change in the inner space can be prevented even when the temperature of the sensor unit changes due to the heat received from the target fluid, so that accurate measurement can be made.

In the physical quantity measuring device according to the above aspect of the invention, it is preferable that the physical quantity measuring device further includes a pipe member that intercommunicates a space between the first partition member and the board and the inner space of the cylindrical portion, in which a first end of the pipe member is opened in the inner space of the cylindrical portion, the first end protruding from the first partition member into the inner space of the cylindrical portion.

According to the above arrangement, the space between the first partition member and the board is in communication with the inner space of the cylindrical portion through the pipe member. Accordingly, the pressure change in the space can be prevented even when the temperature of the sensor unit changes due to the heat received from the target fluid, so that accurate measurement can be made. Further, the protruded configuration of the pipe member does not easily allow the dew condensation, which is generated in the inner space of the cylindrical portion, to enter the pipe member, so that the dew condensation is kept from flowing into the sensor unit through the pipe member.

DESCRIPTION OF EMBODIMENT(S)

First Exemplary Embodiment

A physical quantity measuring device 1 according to a first exemplary embodiment of the invention will be described below with reference to FIGS. 1 to 4, and FIGS. 5A, 5B and 5C. The physical quantity measuring device according to the first exemplary embodiment is a pressure measuring device including a sensor for detecting pressure.

Figure 1:
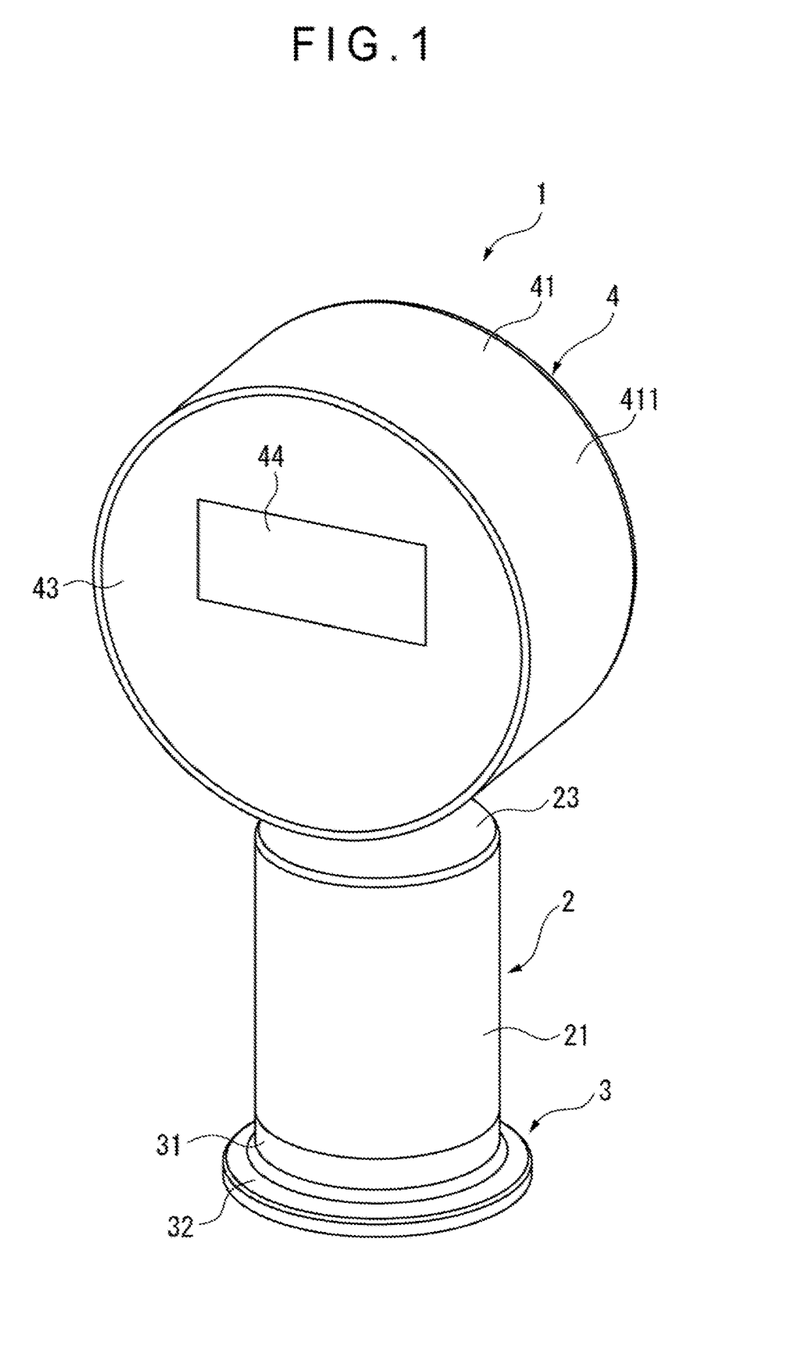
FIG. 1 is a perspective view showing a physical quantity measuring device according to a first exemplary embodiment of the invention.
Figure 2:
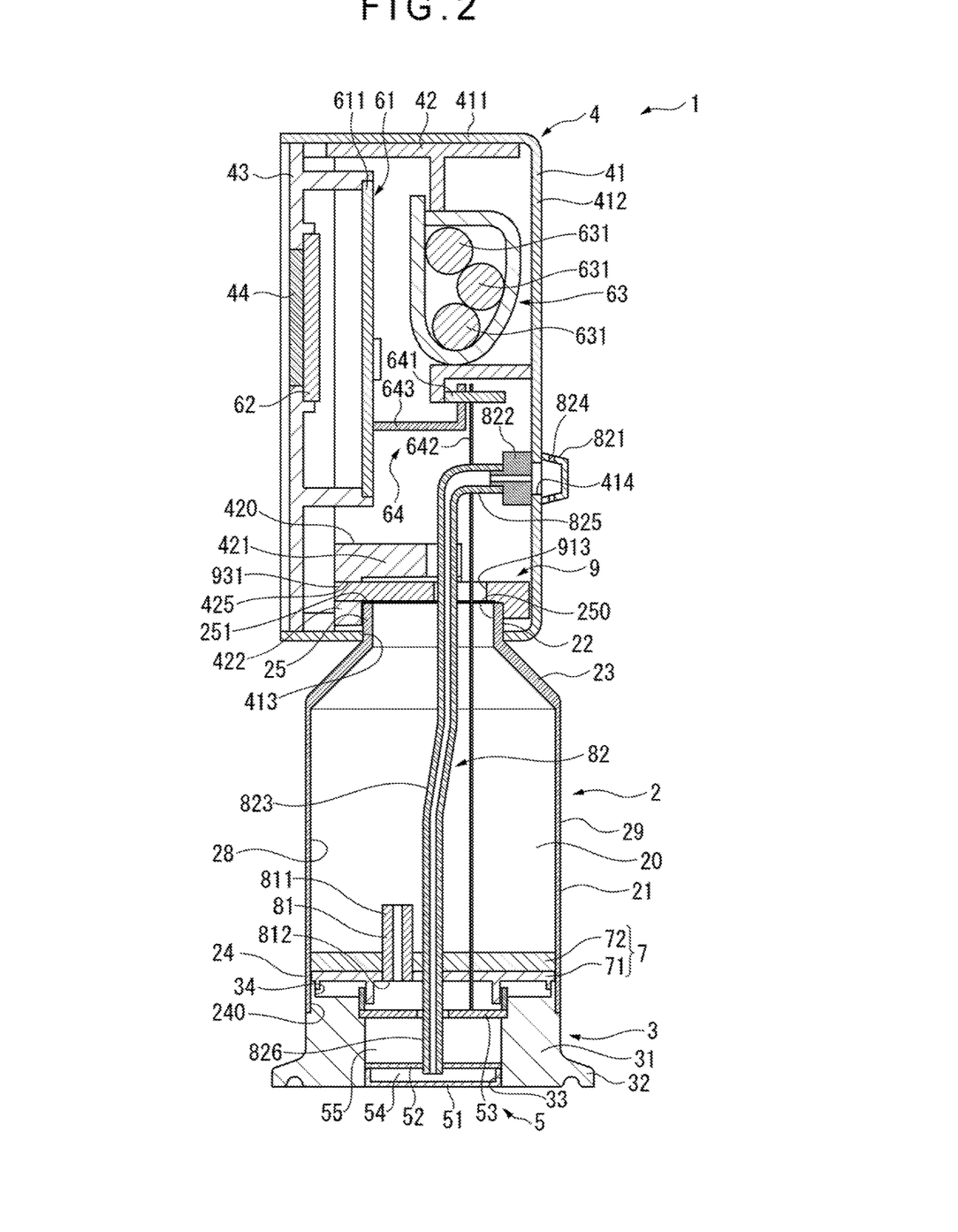
FIG. 2 is a cross sectional view showing the physical quantity measuring device according to the first exemplary embodiment.

As shown in FIGS. 1 and 2, the physical quantity measuring device 1 includes: a cylindrical portion 2; a first case 3 provided at a first end 24 of the cylindrical portion 2; a second case 4 provided at a second end 25 of the cylindrical portion 2; a sensor unit 5 housed in the first case 3; a first partition member 7 that separates the sensor unit 5 from an inner space 20 of the cylindrical portion 2; a second partition member 9 that separates the inner space 20 of the cylindrical portion 2 from a circuit portion 61; and components housed in the second case 4 such as the circuit portion 61, a display 62 and a power supply 63.

The cylindrical portion 2 is a component made of metal (e.g. stainless steel). Air is filled in the inner space 20 in the cylindrical portion 2.

The cylindrical portion 2 includes a large-diameter cylindrical portion 21 near the first case 3, a small-diameter cylindrical portion 22 near the second case 4, and a connector cylindrical portion 23 connecting the large-diameter cylindrical portion 21 and the small-diameter cylindrical portion 22.

The large-diameter cylindrical portion 21, the small-diameter cylindrical portion 22 and the connector cylindrical portion 23 have the same thicknesses. The diameter of the large-diameter cylindrical portion 21 is larger than the diameter of the small-diameter cylindrical portion 22.

The large-diameter cylindrical portion 21 and the small-diameter cylindrical portion 22 each have a linear cross section along an axial direction and a circular outer cross section along a direction orthogonal to the axial direction. The diameter of the connector cylindrical portion 23 is gradually tapered from the large-diameter cylindrical portion 21 toward the small-diameter cylindrical portion 22.

The first case 3 is a component made of metal (e.g. stainless steel) and having a thick cylinder 31 and a flange 32 provided at a lower side of the cylinder 31 and flared radially outward. The thickness of the cylinder 31 is greater than the thickness of the cylindrical portion 2. The first end 24 of the cylindrical portion 2 is fitted to an outer circumferential surface of the cylinder 31 of the first case 3.

The second case 4 is a component made of metal (e.g. stainless steel). The second case 4 includes an outer case 41 and an inner case 42. The outer case 41 and the inner case 42 are kept from relative rotation by the second partition member 9.

The outer case 41 is a bottomed-cylindrical component. The outer case 41 includes a cylinder portion 411 disposed so that an axial direction of the cylinder portion 411 is orthogonal to the axial direction of the cylindrical portion 2, and a bottom 412 that closes one of openings of the cylinder portion 411. The cylinder portion 411 is provided with a hole 413 into which the second end 25 of the cylindrical portion 2 is inserted.

An outer circumferential surface of the inner case 42 is fitted to an inner circumferential surface of the cylinder portion 411 of the outer case 41. The inner case 42 houses therein the circuit portion 61, the display 62, the power supply 63 and the like.

Figure 3:
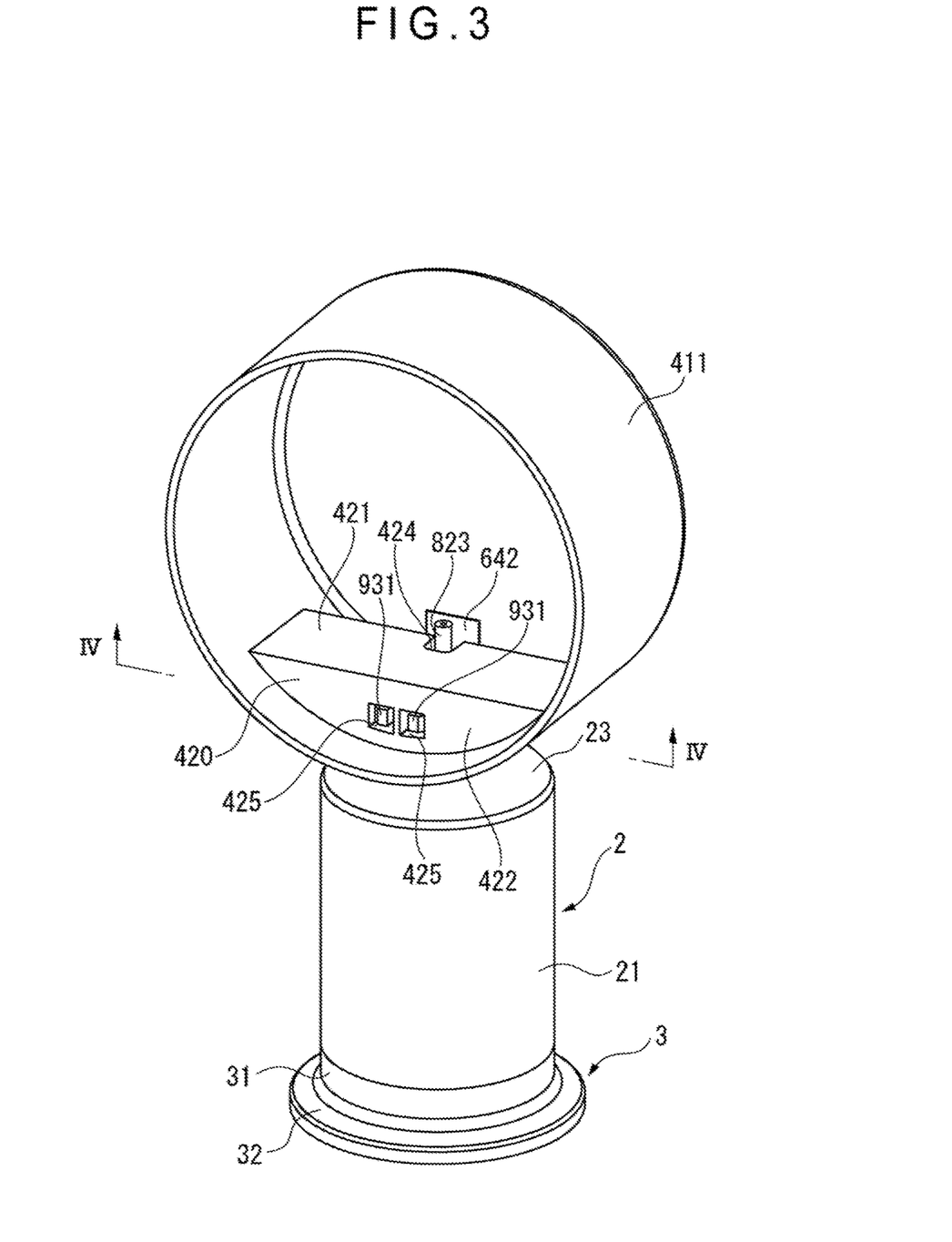
FIG. 3 is a perspective view showing the physical quantity measuring device according to the first exemplary embodiment, in which a part of an interior of an outer case is not illustrated.
Figure 4:
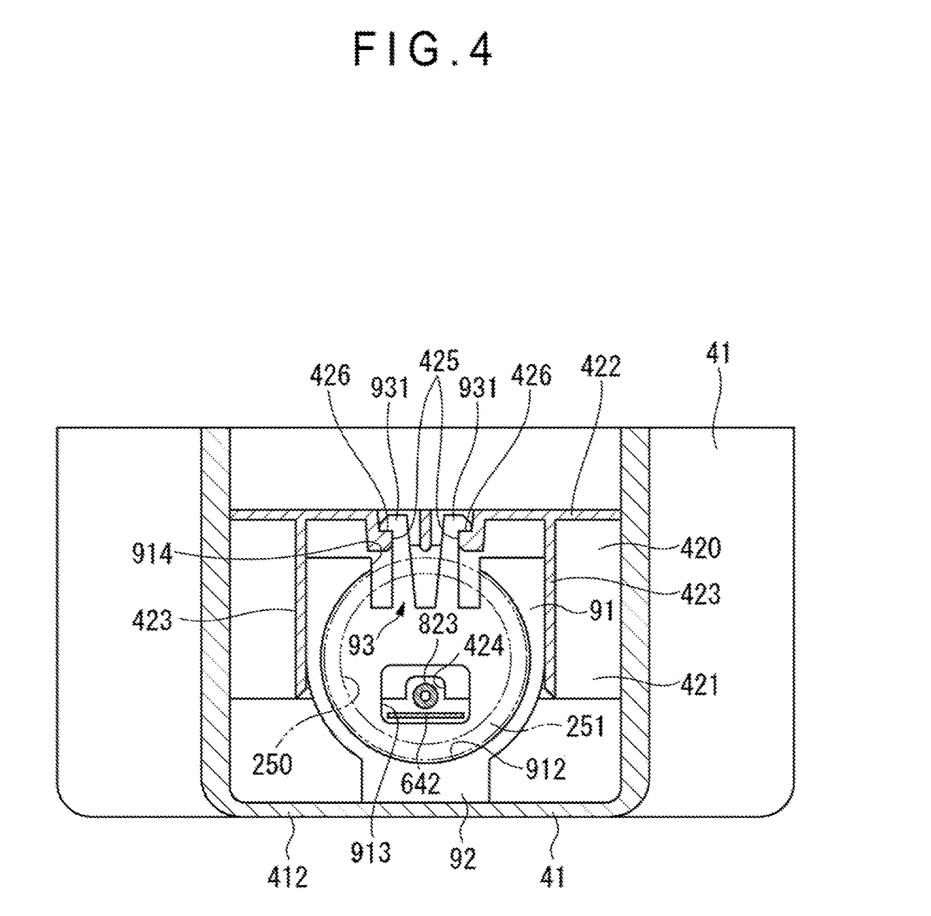
FIG. 4 is a cross sectional view taken along IV-IV lines in FIG. 3.

The inner case 42 has a partition wall 420 disposed adjacent to the second end 25 of the cylindrical portion 2. The partition wall 420 includes: a top wall 421 disposed to cover the second end 25 of the cylindrical portion 2 across a later-described engagement portion 93 of the second partition member 9; a front wall 422 disposed on a front side of the engagement portion 93; and two side walls 423 extending from the front wall 422 to hold the engagement portion 93 on both sides. A groove 424 for keeping a later-described tube 823 from interfering with the partition wall 420 is provided on the top wall 421 of the partition wall 420. The front wall 422 of the partition wall 420 is provided with two engagement holes 425 with which the engagement portion 93 is engaged.

A front panel 43 is provided on a front side of the outer case 41 and the inner case 42. A glass window 44 is provided at a part of the front panel 43 facing the display 62.

The sensor unit 5 is disposed in the first case 3. The sensor unit 5 of the first exemplary embodiment is an electrostatic capacitance sensor, which includes a diaphragm 51, a board 52 and an output board 53.

The diaphragm 51 is exposed to an outside through an opening 33 of the first case 3 and is deformable in response to a pressure change of a target fluid in contact with the diaphragm 51. An inner space 54 is defined between the board 52 and the diaphragm 51. The board 52 supports the diaphragm 51 to enclose the inner space 54.

An electronic component(s) such as an ASIC is installed on the output board 53. The output board 53 is configured to detect the pressure change of the target fluid as a change in an electrostatic capacitance between electrodes (not shown) formed on the diaphragm 51 and the board 52, and output the detected change in a form of capacitance signals.

It should be noted that a relatively large hole, through which a later-described tube 823 is inserted, is formed in the output board 53, so that the spaces on both sides of the output board 53 are not completely isolated by the output board 53.

The circuit portion 61 is housed in the inner case 42 of the second case 4. The circuit portion 61 has a control board 611 on which an electronic component(s) is installed. The control board 611 is electrically connected to the sensor unit 5 through a wiring portion 64 so as to receive the capacitance signals from the sensor unit 5.

The wiring portion 64 includes: a connection board 641 fixed inside the inner case 42; a first line 642 having a first end connected to the output board 53 of the sensor unit 5 and a second end connected to the connection board 641; and a second line 643 having a first end connected to the connection board 641 and a second end connected to the control board 611 of the circuit portion 61.

The circuit portion 61 is electrically connected to the display 62. When the circuit portion 61 receives the capacitance signals from the sensor unit 5, the circuit portion 61 calculates a pressure value of the target fluid based on the capacitance signals and outputs control signals for displaying the pressure value to the display 62.

The display 62 includes a display element, which displays the pressure value of the target fluid based on the control signals received from the circuit portion 61. Examples of the display element include an organic electroluminescence device and a liquid crystal display.

The power supply 63 includes, for instance, a plurality of dry-cell batteries 631. The power supply 63 is electrically connected to the sensor unit 5, the circuit portion 61, the display 62 and the like to power these components for operation.

The first partition member 7 is provided to the first end 24 of the cylindrical portion 2. The first partition member 7 includes a heat insulating portion 71 facing the sensor unit 5 and a sealing portion 72 provided opposite the sensor unit 5 with respect to the heat insulating portion 71.

The heat insulating portion 71 is, for instance, a packing made of a heat-resistant resin. The heat insulating portion 71 is configured to seal a first-end opening 240 of the cylindrical portion 2 and an opening 34 of the first case 3 near the cylindrical portion 2.

The sealing portion 72 is a resin member disposed to fully cover a surface of the heat insulating portion 71 on a side where the inner space 20 of the cylindrical portion 2 is defined. The sealing portion 72 is, for instance, a mold resin formed by pouring resin into the cylindrical portion 2 from the second end 25 of the cylindrical portion 2 with the heat insulating portion 71 being disposed at the first end 24 of the cylindrical portion 2. The sealing portion 72 forms a hermetic seal between the heat insulating portion 71 and an inner circumferential surface 28 of the cylindrical portion 2.

A pipe member 81, which penetrates through the first partition member 7 to protrude into the inner space 20 of the cylindrical portion 2, is provided to the first partition member 7. A first end 811 of the pipe member 81 is opened in the inner space 20 of the cylindrical portion 2. A second end 812 of the pipe member 82 is opened in a space 55 between the first partition member 7 and the board 52.

The second partition member 9 may be an integrally molded component made of a heat-resistant resin. The second partition member 9 is provided to the second end 25 of the cylindrical portion 2. The configuration of the second partition member 9 will be described in further detail below with reference to FIGS. 3, 4, 5A, 5B and 5C. It should be noted that a part of an interior of the outer case 41 of the second case 4 is not illustrated in FIG. 3.

As shown in the above figures, the second partition member 9 includes: a plate-shaped base 91; a contact portion 92 integrally formed on a first peripheral end of the base 91; and an engagement portion 93 integrally formed on a second peripheral end of the base 91 opposite the first peripheral end.

The base 91 is disposed at the second end 25 of the cylindrical portion 2, which is inserted into the hole 413 of the outer case 41. A substantially circular recess 912 is formed on a surface 911 of the base 91 near the cylindrical portion 2. The second end 25 of the cylindrical portion 2 is fitted to the recess 912. Thus, the base 91 is in contact with an opening edge 251 of the second end 25 of the cylindrical portion 2.

Figure 5A:
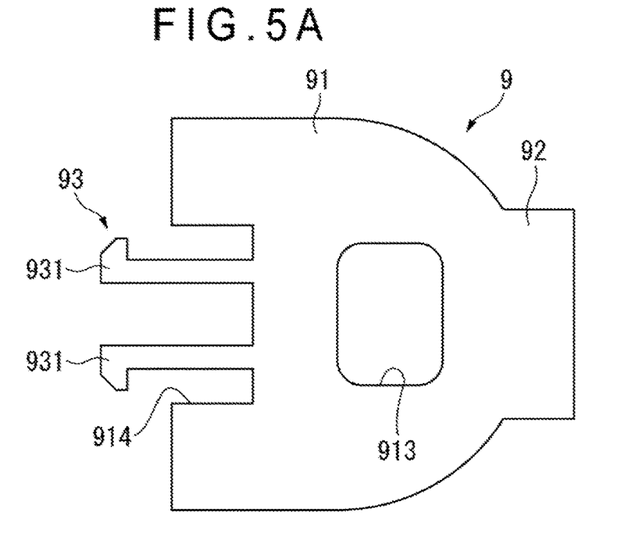
FIG. 5A is a plan view showing a second partition member.
Figure 5B:
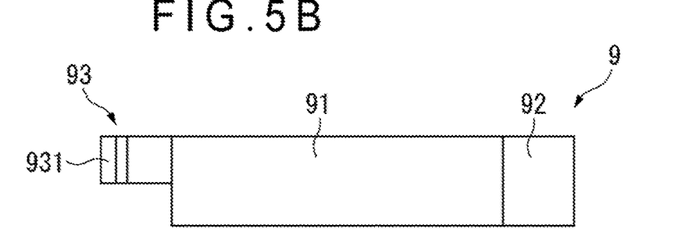
FIG. 5B is a side elevational view showing the second partition member.
Figure 5C:
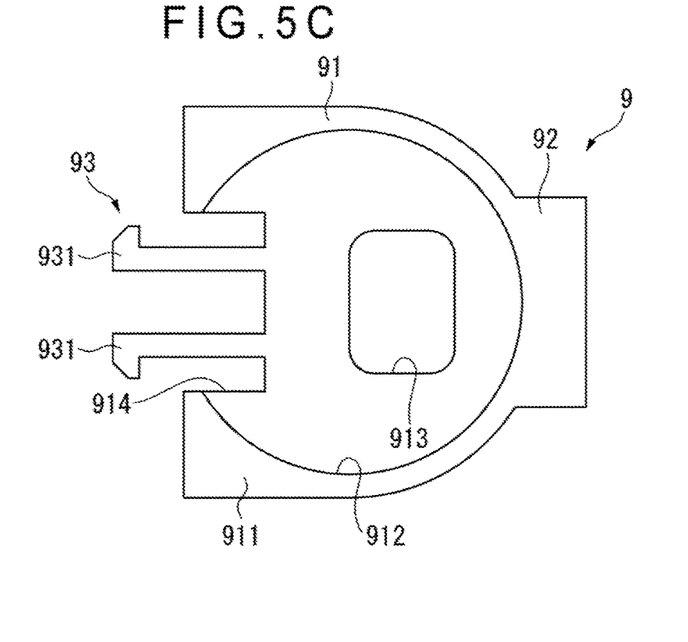
FIG. 5C is a bottom view showing the second partition member.

An insertion hole 913, into which the first line 642 of the wiring portion 64 and a later-described air releaser 82 are inserted, is provided inside the recess 912 of the base 91. The insertion hole 913 is located radially inside the opening edge 251 of the cylindrical portion 2.

The contact portion 92 extends from the first peripheral end of the base 91. A groove 914 is formed on a peripheral end of the base 91 opposite the contact portion 92. The base 91 is held by side walls 423 of the partition wall 420 from both sides and is covered with the top wall 421 of the partition wall 420 at a part at least including the grooves 914.

The contact portion 92 linearly and radially extends outward from the base 91 to be in contact with the bottom 412 of the outer case 41.

The engagement portion 93 includes two claws 931 protruding radially outward from an inside of the groove 914 formed on the base 91. The claws 931 penetrate through engagement holes 425 formed in the front wall 422 of the partition wall 420 to be elastically engaged with rims 426 of the engagement holes 425.

The air releaser 82 intercommunicates the inner space 54 of the sensor unit 5 and an outside of the physical quantity measuring device 1. Specifically, the air releaser 82 includes: a release portion 821 provided on the outer case 41; a cylindrical tube connector 822 fixed to an inner side of the outer case 41; and a tube 823 having an end connected to the tube connector 822.

The release portion 821 is a cup-shaped component disposed to cover a hole 414 formed in the outer case 41. A plurality of openings 824 are formed in a lateral face of the release portion 821. The tube 823 penetrates through the board 52 and the first partition member 7 and through a hole provided to each of the output board 53 and the second partition member 9. A first end 825 of the tube 823 is in communication with the outside through the tube connector 822 and the release portion 821. A second end 826 of the tube 823 is opened in the inner space 54 of the sensor unit 5.

Advantage(s) of First Exemplary Embodiment

The following advantages can be obtained by the first exemplary embodiment.
(1) Since the first partition member 7 having the heat insulating portion 71, the inner space 20 of the cylindrical portion 2 defined between the first partition member 7 and the second partition member 9, and the heat-insulative second partition member 9 each insulate the heat, the heat of the sensor unit 5 received from the target fluid can be restrained from being transmitted to the circuit portion 61, the display 62 and the battery unit 63. In addition, even when a dew condensation is generated in the inner space 20 of the cylindrical portion 2 due to a great difference between the temperature in the inner space 20 of the cylindrical portion 2 and an ambient temperature thereof, the dew condensation does not cause malfunction of the circuit portion 61 and the like. In other words, since the sealing portion 72 of the first partition member 7 separates the heat insulating portion 71 and the inner circumferential surface 28 of the cylindrical portion 2 at the first end 24 of the cylindrical portion 2, the dew condensation is kept from flowing from the inner space 20 of the cylindrical portion 2 into the first case 3. Since the second partition member 9 separates the inner space 20 of the cylindrical portion 2 from the circuit portion 61 while being in contact with the opening edge 251 of the second end 25 of the cylindrical portion 2, the dew condensation flowing along the inner circumferential surface 28 of the cylindrical portion 2 is blocked by the second partition member 9 even when the physical quantity measuring device 1 is disposed with the second case 4 being located at a lower side.

Further, in the first exemplary embodiment, not only the circuit portion 61 but also the display 62 and the power supply 63 are housed in the second case 4. Accordingly, the heat of the sensor unit 5 can be restrained from being transmitted to the display 62 and the power supply 63, and the dew condensation can be kept from adversely affecting the display 62 and the power supply 63 in the first exemplary embodiment.

(2) The physical quantity measuring device 1 of the first exemplary embodiment is not provided with the cooling fins as in the related art and an outer circumferential surface 29 of the cylindrical portion 2 has a smooth profile. The above arrangement eliminates the necessity for cleaning the narrow recesses, which may be defined in the cooling fins, facilitating the cleaning of the device. Thus, the physical quantity measuring device 1 is suitably usable in an environment required to be sufficiently hygienic. Since air is filled in the inner space 20 of the cylindrical portion 2, the thickness of the cylindrical portion 2 can be reduced as compared with the cylindrical portion 2 filled with coolant. Accordingly, the heat can be restrained from being transmitted from the first case 3 housing the sensor unit 5 to the second case 4 through the cylindrical portion 2. Further, the air layer formed in the inner space 20 of the cylindrical portion 2 can also be used to insulate the heat.

(3) The configuration of the cylindrical portion 2 allows an increase in the size of the large-diameter cylindrical portion 21 without changing the sizes of the second case 4 and the small-diameter cylindrical portion 22 and consequently, changing the size of the entire device. Since the surface area increases by increasing the size of the large-diameter cylindrical portion 21, a large heat dissipation effect can be obtained. Further, when a variety of the physical quantity measuring devices 1 with different sizes of the large-diameter cylindrical portions 21 are to be manufactured, the production cost can be reduced by using common components for the second case 4 and common components for the second partition member 9 for the physical quantity measuring devices 1.

(4) Since the heat insulating portion 71 of the first partition member 7 is in a form of the heat-resistant-resin packing, the structure of the heat insulating portion 71 can be simplified and the heat insulating portion 71 can be easily attached to the cylindrical portion 2.

(5) According to the first exemplary embodiment, the sealing portion 72 can be formed by pouring the resin into the cylindrical portion 2 while the heat insulating portion 71 is provided in the cylindrical portion 2. Accordingly, the sealing portion 72 can be easily disposed.

(6) The inner space 54 of the sensor unit 5 is in communication with the outside through the air releaser 82. Accordingly, the pressure change in the inner space 54 can be prevented even when the temperature of the sensor unit 5 changes due to the heat received from the target fluid, so that accurate measurement can be made.

(7) The space 55 between the first partition member 7 and the board 52 is in communication with the inner space 20 of the cylindrical portion 2 through the pipe member 81. Accordingly, the pressure change in the space 55 can be prevented even when the temperature of the sensor unit 5 changes due to the heat received from the target fluid, so that accurate measurement can be made. Further, the protruded configuration of the pipe member 81 does not easily allow the dew condensation, which is generated in the inner space 20 of the cylindrical portion 2, to enter an inside of the pipe member 81, so that the dew condensation is kept from flowing into the sensor unit 5 through the pipe member 81.

(8) According to the first exemplary embodiment, the second case 4 can be easily attached to the cylindrical portion 2 using the second partition member 9. For instance, with the second end 25 of the cylindrical portion 2 penetrating through the outer case 41, the base 91 of the second partition member 9 is fitted to the second end 25 and the contact portion 92 is brought into contact with the bottom 412 of the outer case 41. Then, while the inner case 42 is fitted to the outer case 41, the engagement portion 93 of the second partition member 9 is engaged with the inner case 42. Thus, the cylindrical portion 2, the outer case 41 and the inner case 42 are connected with one another via the second partition member 9. Specifically, the second partition member 9 keeps the inner case from rotating along the inner circumferential surface of the outer case 41 and also serves as a fastener for preventing the detachment of the inner case from the outer case. Since the second partition member 9 also serves as the fastener for preventing the rotation of the inner case 42 with respect to the outer case 41, the number of components and, consequently, production cost can be reduced.

(9) Though the groove 914, in which the engagement portion 93 is defined, is formed in the base 91 of the second partition member 9, the dew condensation is kept from entering the inner case 42 by the partition wall 420 of the inner case 42 covering the groove 914 of the base 91.

(10) Since the base 91 of the second partition member 9 covers at least a part of the second-end opening 250 of the cylindrical portion 2 not covered with the partition wall 420 and adjacent to the opening edge 251, the base 91 of the second partition member 9 can block the flow of the dew condensation along the inner circumferential surface 28 of the cylindrical portion 2. Specifically, since the insertion hole 913 is defined in the base 91 of the second partition member 9 and the tube 823 is inserted into the insertion hole 913, the partition wall 420 of the inner case 42 cannot completely cover the insertion hole 913. However, since the insertion hole 913 is located radially inside with respect to the opening edge 251 of the second end 25 of the cylindrical portion 2 in the first exemplary embodiment, the flow of the dew condensation can be blocked.

Second Exemplary Embodiment

Figure 6:
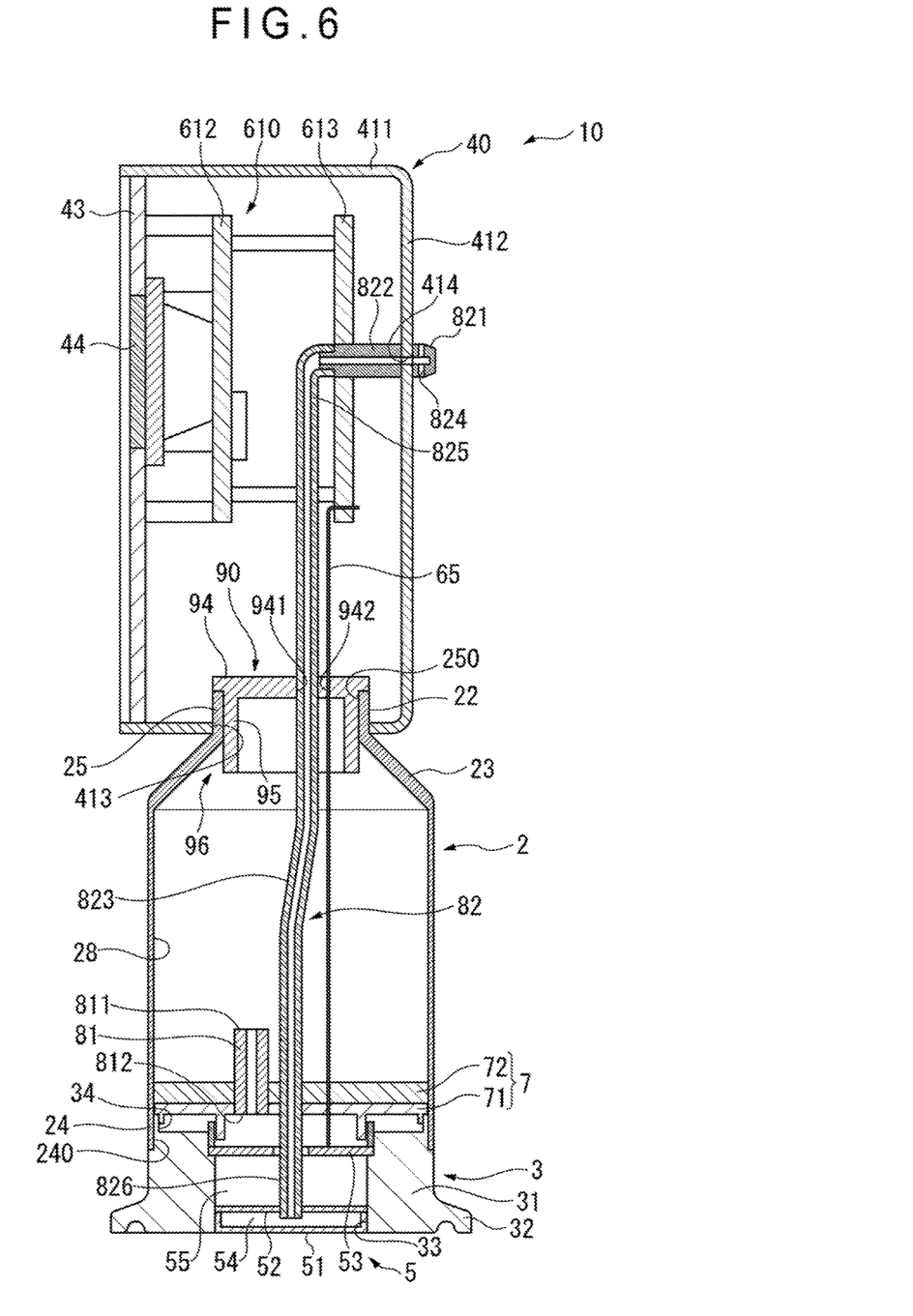
FIG. 6 is a cross sectional view showing a second exemplary embodiment of the invention.
Figure 7:
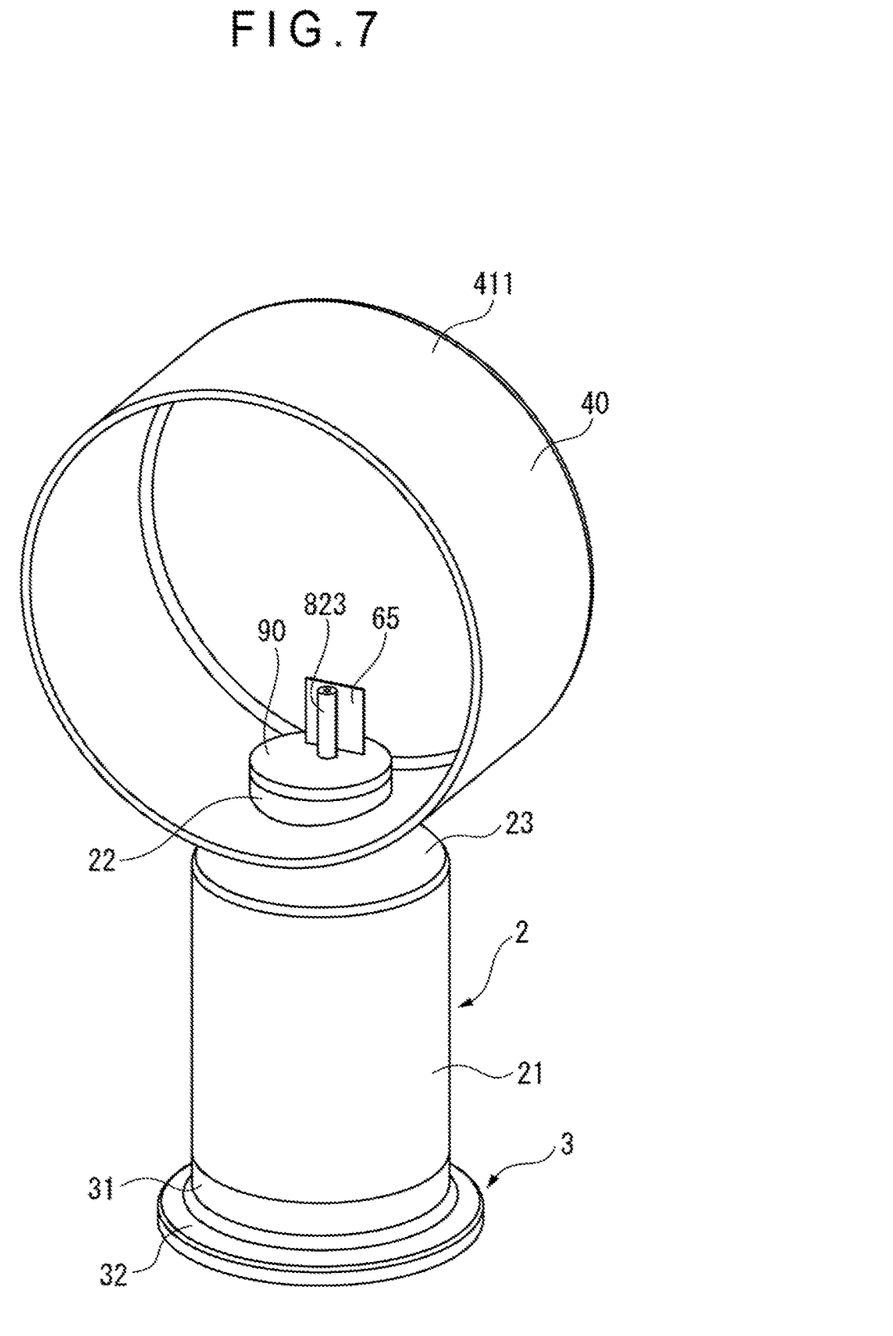
FIG. 7 is a perspective view showing the physical quantity measuring device according to the second exemplary embodiment, in which a part of an interior of a second case is not illustrated.

A physical quantity measuring device 10 according to a second exemplary embodiment of the invention will be described below with reference to FIGS. 6 and 7. It should be noted that the same components in the second exemplary embodiment as those in the first exemplary embodiment will be denoted by the same reference numerals to omit the description thereof. It should also be noted that a part of an interior of a second case 40 is not illustrated in FIG. 7.

The second exemplary embodiment differs from the first exemplary embodiment in terms of the configuration of the second case 40, the configuration of the components disposed in the second case 40 and the configuration of the second partition member 90.

The second case 40 includes a component corresponding to the outer case 41 in the first exemplary embodiment and does not include the inner case. Specifically, the second case 40 includes the cylinder portion 411 disposed so that an axial direction of the cylinder portion 411 is orthogonal to the axial direction of the cylindrical portion 2, and the bottom 412 that closes one of openings of the cylinder portion 411.

A circuit portion 610 includes two control boards 612, 613 that are disposed in parallel with each other. A line 65 extending from the output board 53 of the sensor unit 5 is connected to one of the control boards 613.

Since the power supply is not installed in the second case 40, the control board 613 is connected to an external power supply through a non-illustrated line.

The second partition member 90 is a heat-resistant-resin packing. The second partition member 90 includes a base 94 provided at the second end 25 of the cylindrical portion 2 and an annular wall 95 extending from the base 94 toward the inner space 20 of the cylindrical portion 2.

The base 94 is disposed to close the second-end opening 250 of the cylindrical portion 2. The base 94 is provided with an insertion hole 941 into which the tube 823 is inserted and an insertion hole 942 into which the line 65 is inserted. The tube 823 and the line 65 are respectively inserted into the insertion holes 941, 942 to be in close contact with inner surfaces of the insertion holes 941, 942.

The annular wall 95 is in contact with the cylindrical portion 2 along an inner circumferential surface of the small-diameter cylindrical portion 22. The annular wall 95 defines, in combination with an inner circumferential surface of the connector cylindrical portion 23, a receiver 96 recessed toward the second end 25 of the cylindrical portion 2.

Advantage(s) of Second Exemplary Embodiment

The second exemplary embodiment offers the following advantage in addition to the advantages (1) to (7) in the first exemplary embodiment.

The second partition member 90 includes the base 94 provided at the second end 25 of the cylindrical portion 2 and the annular wall 95 extending from the base 94 toward the inner space 20 of the cylindrical portion 2. The annular wall 95 defines the receiver 96 recessed toward the second end 25 of the cylindrical portion 2. Accordingly, when the physical quantity measuring device 10 is disposed with the second case 40 being located at a lower side, the dew condensation flowing along the inner circumferential surface 28 of the cylindrical portion 2 enters the receiver 96 to be trapped therein. Accordingly, the dew condensation can be further reliably kept from flowing into the second case 40.

Modifications

It should be understood that the scope of the present invention is not limited to the above-described exemplary embodiment(s) but includes any modifications and improvements compatible with the invention.

For instance, though the inner space 20 of the cylindrical portion 2 is filled with air in the above exemplary embodiments, the inner space 20 of the invention may be filled with coolant or the like instead of air. In this case, the insertion holes 913, 941, 942 and the groove 914 of the second partition members 9, 90 may be sealed using a paste or the like.

Further, the cylindrical portion 2 may have none of the large-diameter cylindrical portion 21 and the small-diameter cylindrical portion 22 and may be in a form of simple cylinder. In this case, in order to provide the receiver 96 in the second exemplary embodiment, the annular wall 95 of the second partition member 90 may be in contact with the inner circumferential surface 28 of the cylindrical portion 2 at a side near the base 94, while being distanced from the inner circumferential surface 28 as extending away from the base 94.

Further, it is not necessary for the sealing portion 72 of the first partition member 7 to cover the entire surface of the heat insulating portion 71. For instance, the sealing portion 72 may provide a hermetic seal only at a part between the heat insulating portion 71 and the inner circumferential surface 28 of the cylindrical portion 2.

Further, though the display 62 is housed inside the second case 4 and the pressure value detected by the sensor unit 5 is displayed on the display 62 in the above exemplary embodiment, the physical quantity measuring device of the invention may have no display and may send signals indicating the pressure value detected by the sensor unit to an outside.

Though the physical quantity measuring devices 1, 10 in the above-described exemplary embodiments are pressure measuring devices having the sensor unit 5 for detecting pressure, the physical quantity measuring device of the invention may alternatively be a physical quantity measuring device having a sensor for detecting differential pressure as long as the physical amount can be measured using pressure or a physical quantity measuring device having a sensor for detecting a physical amount other than pressure (e.g. temperature).

What is claimed is:

1. A physical quantity measuring device comprising:
a cylindrical portion defining an inner space;
a first case provided to a first end of the cylindrical portion;
a sensor unit housed in the first case, the sensor unit being configured to output a signal corresponding to a physical amount of a target fluid;
a second case provided to a second end of the cylindrical portion;
a circuit portion housed in the second case, the circuit portion being configured to calculate the physical amount of the target fluid based on the signal received from the sensor unit;
a first partition member comprising a heat insulating portion disposed to face the sensor unit and a sealing portion configured to provide a hermetic seal between the heat insulating portion and an inner circumferential surface of the cylindrical portion, the first partition member defining a partition between the sensor unit and the inner space of the cylindrical portion near the first end of the cylindrical portion; and
a heat-insulative second partition member that is in contact with an opening edge or the inner circumferential surface of the second end of the cylindrical portion, the second partition member defining a partition between the inner space of the cylindrical portion and the circuit portion near the second end of the cylindrical portion.

2. The physical quantity measuring device according to claim 1, wherein
the inner space of the cylindrical portion is filled with air, and
the cylindrical portion has a circular outer cross section whose diameter is constant or gradually changes along an axial direction of the cylindrical portion.

3. The physical quantity measuring device according to claim 1, wherein
the cylindrical portion comprises:
a large-diameter cylindrical portion provided with the first case and the first partition member;
a small-diameter cylindrical portion provided with the second case and the second partition member; and
a connector cylindrical portion that connects the large-diameter cylindrical portion and the small-diameter cylindrical portion.

4. The physical quantity measuring device according to claim 1, wherein
at least one of the heat insulating portion of the first partition member or the second partition member is a heat-resistant-resin packing.

5. The physical quantity measuring device according to claim 1, wherein the sealing portion of the first partition member is a resin member fully covering one surface of the heat insulating portion.

6. The physical quantity measuring device according to claim 1, wherein
the second case comprises a bottomed-cylindrical outer case and an inner case provided therein with the circuit portion, an outer circumferential surface of the inner case being fitted to an inner circumferential surface of the outer case,
the second end of the cylindrical portion penetrates through the outer case to be positioned in the outer case, and
the second partition member comprises:
a base that is in contact with an opening edge of the second end of the cylindrical portion at an inside of the outer case and is fitted to the second end;
an engagement portion engaged with the inner case; and
a contact portion that is in contact with a bottom of the outer case.

7. The physical quantity measuring device according to claim 1, wherein
the second partition member comprises:
a base disposed to cover an opening of the second end of the cylindrical portion; and
an annular wall that extends from the base to the inner space of the cylindrical portion and is in contact with the inner circumferential surface of the second end of the cylindrical portion, wherein
the inner circumferential surface of the cylindrical portion and the annular wall define a receiver therebetween, the receiver being recessed toward the second end of the cylindrical portion.

8. The physical quantity measuring device according to claim 1, wherein
the sensor unit comprises a diaphragm, and a board supporting the diaphragm,
an inner space is defined between the board and the diaphragm, and
the physical quantity measuring device further comprises an air releaser that intercommunicates the inner space of the sensor unit and an outside.

9. The physical quantity measuring device according to claim 8, further comprising:
a pipe member that intercommunicates a space between the first partition member and the board and the inner space of the cylindrical portion, wherein
a first end of the pipe member is opened in the inner space of the cylindrical portion, the first end protruding from the first partition member into the inner space of the cylindrical portion.

* * * * *